Oct. 8, 1935.
J. A. WATSON
2,016,405
LUBRICATING DEVICE
Filed June 2, 1932
3 Sheets-Sheet 1
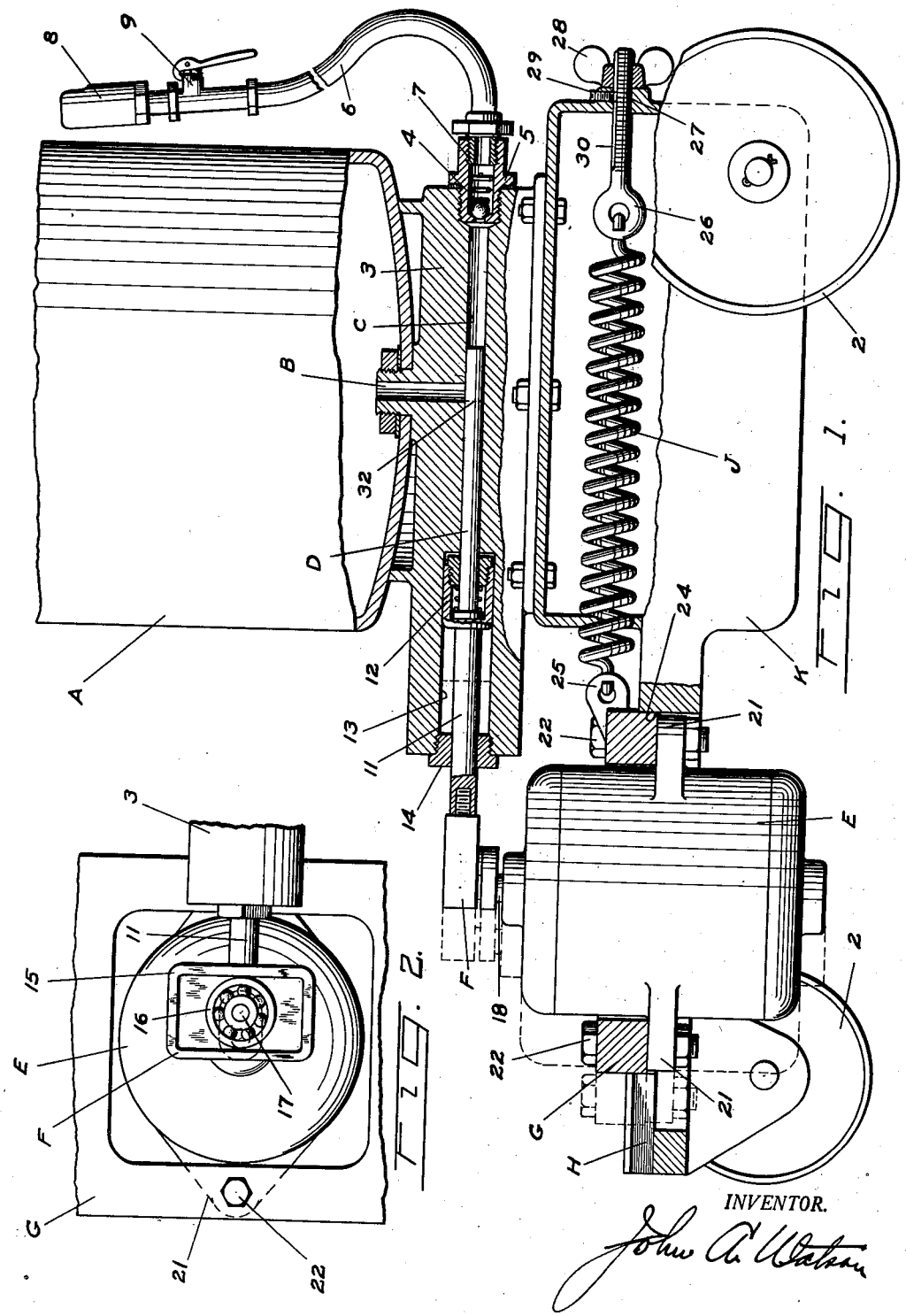
INVENTOR.
John A. Watson

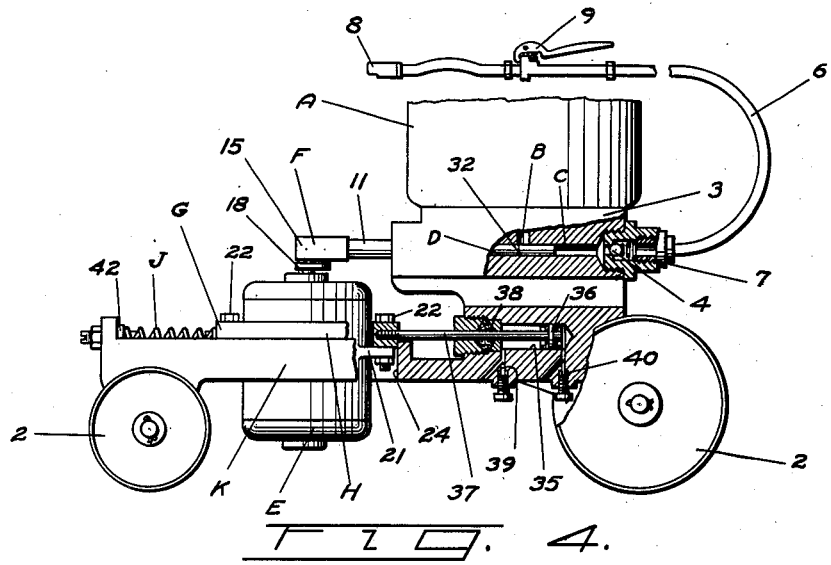
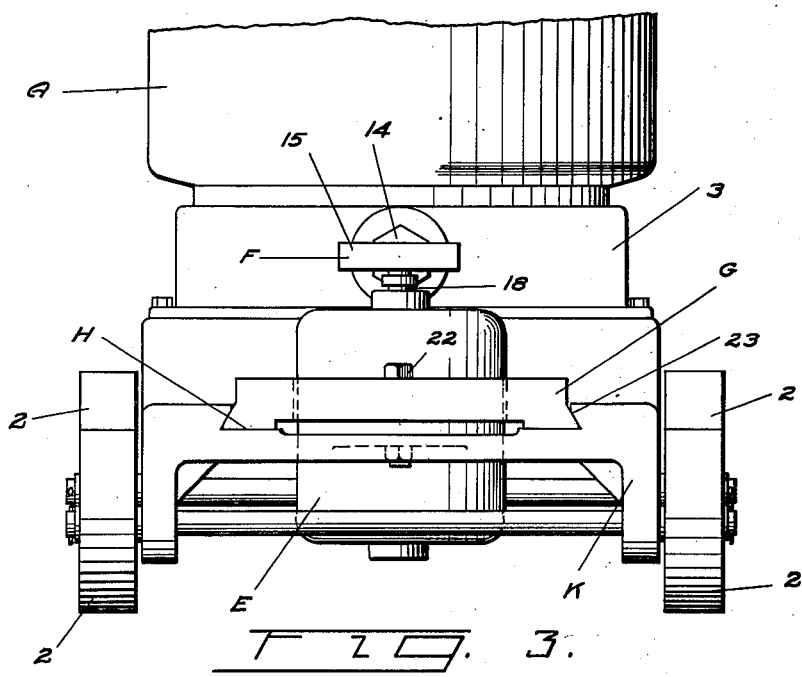

Oct. 8, 1935.  J. A. WATSON  2,016,405
LUBRICATING DEVICE
Filed June 2, 1932  3 Sheets-Sheet 3
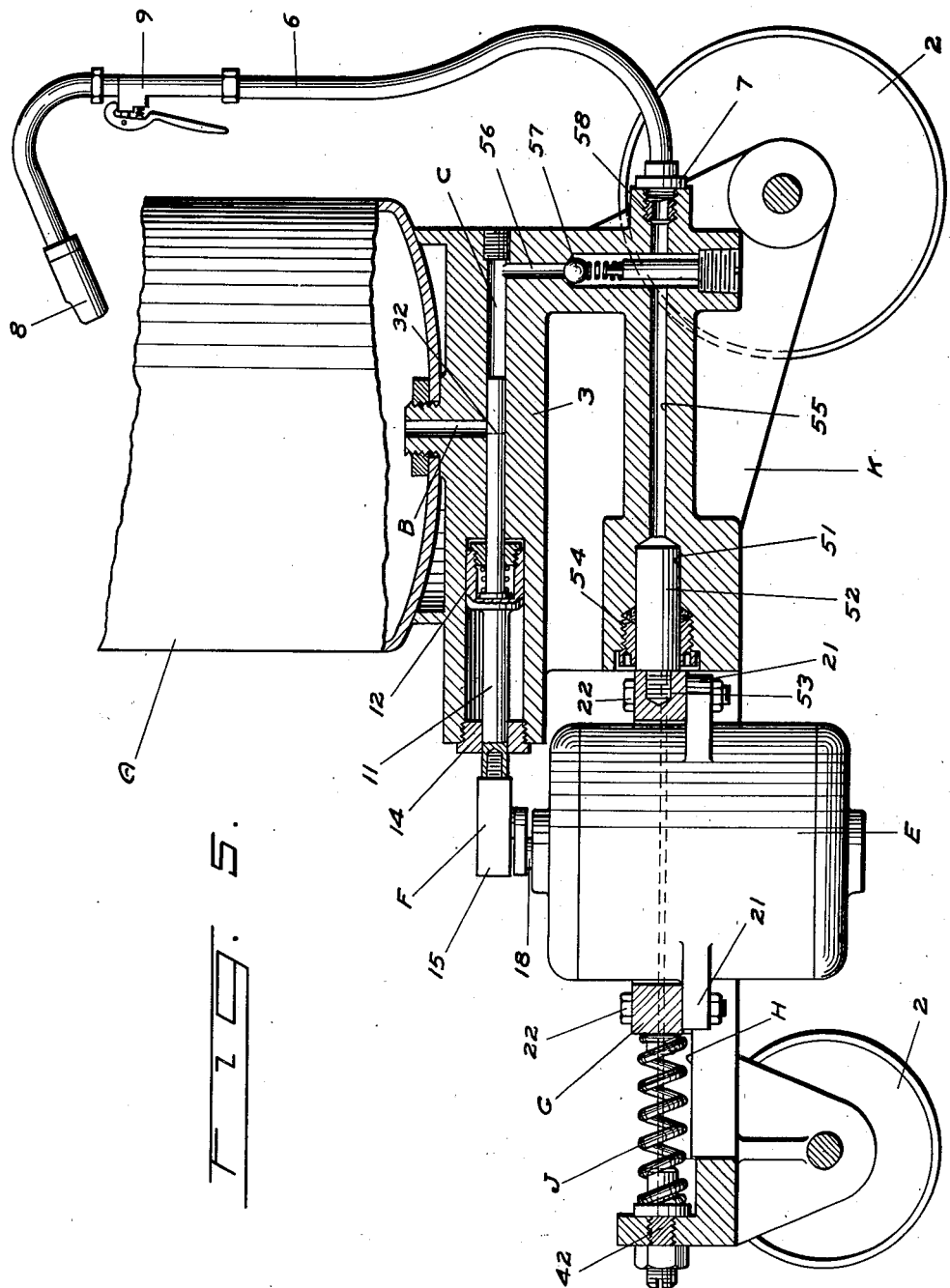
INVENTOR.
John A. Watson Patented Oct. 8, 1935

2,016,405

UNITED STATES PATENT OFFICE 2,016,405

LUBRICATING DEVICE

John A. Watson, South Bend, Ind., assignor to The Lubrication Corporation, South Bend, Ind., a corporation of Delaware Application June 2, 1932, Serial No. 614,969

20 Claims. (Cl. 103—37)

This invention pertains to lubricant pumping apparatus of the character designed to supply lubricant from a reservoir or the like to a service nozzle under a relatively high pressure and, more particularly, to pumps of the power operated type.

It has been found desirable in certain instances, to drive the pump unit continuously over a period of time such as the period of time required to lubricate a plurality of bearings on an automobile, instead of stopping the pump unit between the servicing of two or more bearings. On the other hand unless some provision is made to control the pressure of the lubricant in the pump discharge conduit excessive pressures may be built up with danger of rupture of the conduit and other injurious consequences.

A number of schemes designed to prevent excessive pressures in the pump discharge line have been proposed. One scheme involves an arrangement utilizing an automatic pressure relief valve in the discharge line, another plans to shut off the lubricant inlet to the pump upon the attainment of a predetermined pressure in the discharge line and another requires the interpositioning of a spring between the pump and its driving means. However, very little if any attention has been given to reduction of the load on the motor or pump during the time the motor or pump is operating but not doing useful work, that is, when lubricant is not being pumped through the discharge line. In other words, conservation of energy has been entirely neglected in the prior attempts at control of discharge line pressures in pumps of the continuously running type.

An object of my invention is to provide a power driven lubricant pump wherein the pump may be continuously operated and in which the load upon the motor and/or pump is substantially removed upon the building up of a predetermined maximum pressure in the discharge conduit or feeder line.

Another object is to provide a power driven lubricant pump wherein the effective piston displacement of the pump is automatically decreased as developed lubricant pressure is increased above a predetermined value, until the displacement equals zero upon the occurrence of a predetermined maximum developed pressure.

A further object is to provide a power driven lubricant pump in which the pressure responsive mechanism for relieving the motor load as the discharge pressure exceeds a predetermined limit, functions also as an accumulator thereby assuring a substantial and immediate supply of lubricant under a suitable pressure for the discharge line and, in addition, inducing uniformity of flow through the discharge port.

A still further object is to provide damping means for the piston and motor assembly to discourage reaction movements of the piston and motor directly responsive to the reciprocatory strokes of the pump piston.

Other objects, the advantages and uses of the invention will be, or should become, apparent after reading the following description and claims and after consideration of the accompanying drawings, in which:

Fig. 1 is an elevation partly in section illustrating a power driven lubricant pump constructed in accordance with my invention;

Fig. 2 is a fragmentary view along the line II—II of Fig. 1;

Fig. 3 is an end elevation of the pump illustrated in Fig. 1;

Fig. 4 is an elevation, partly in section, of another form of the power driven pump; and Fig. 5 is an elevation, partly in section, of a further modification of the power driven lubricant pump.

In general, the power driven lubricant pumps selected for illustration herein comprise, a reservoir A forming a source of lubricant supply communicating through an inlet port B with the cylinder C of the pump, a piston D mounted for reciprocation within the cylinder C, and an electric motor E, adapted to drive the piston D through a positive driving connection F, mounted upon a cradle G. The cradle G is mounted upon a bed H and arranged for longitudinal movement thereupon parallel to the axis of the cylinder C and is urged toward the cylinder by an adjustable spring J. The entire pump and motor assembly is mounted upon a portable carriage K.

Referring particularly to Figs. 1 to 3 the power driven lubricant pump illustrated therein is of the type intended for use in lubricant service stations and to provide for its semi-portability the carriage K is supported upon wheels 2 by means of which the apparatus may be moved along the service station floor to any location desired. The cylinder C is formed by a bore provided in a body member 3 which may be secured by bolts to the carriage K. Lubricant is discharged from the cylinder C directly through a check valve 4, of the spring pressed ball type, the housing 5 of which may serve as an end closure for the bore of the cylinder. A flexible lubricant conducting hose 6 may be connected directly to the housing 5 as by a threaded coupling member 7 and a lubricant discharge nozzle 8 connected to the outer end of the hose for engaging with a lubricant receiving fitting associated with the bearing or other machinery parts to be lubricated for the purpose of delivering lubricant thereto. A manually operated control valve 9 may be connected in the hose line 6 to control the flow of lubricant to the nozzle 8. The mechanism F comprising, positive driving means for the piston D includes a connecting rod 11 connected through a self-aligning cross head 12 with the piston D. The cross head 12 is slidably disposed within an enlarged portion 13 of the bore of the cylinder C and a bushing 14 is provided at its mouth to align the connecting rod 11 along the axis thereof. A rigid metal frame 15, the inner walls of which define a rectangle, is secured to the outer end of the connecting rod 11 and embraces a ball race 16 mounted about an eccentric pin 17 carried by the shaft 18 of the motor E, whereby rotation of the motor shaft 18 may impart reciprocatory motion to the piston D.

The motor E is secured to the cradle G by means of diametrically opposed lugs 21, which may be formed integral with the housing of the motor, and with which bolts 22 extending through the cradle G are engaged to fix the motor in place. The center of gravity of the motor therefore may be located substantially along the bed H upon which the cradle is slidably mounted. With reference to Fig. 3, the cradle G and the bed H are provided with cooperating and contacting guide surfaces 23 of the type commonly employed for the tool stock of a lathe carriage, which arrangement assures the free movement of the cradle G along a predetermined and fixed axis. Inward movement of the cradle G under force of the spring J is limited by a lateral wall 24 formed on the carriage K. One end of the spring J is connected with a lug 25 formed on the cradle G and the opposite end is connected to an eye bolt 26 which extends through a bore 27 formed in the carriage wall and longitudinal adjustment thereof is afforded by means of a wing nut 28 located on the outer end of the bolt. A key 29 engageable with a key-way 30 formed along one side of the bolt may be employed to prevent rotation of the bolt during adjustment of the spring J through the wing nut 28 and thus preclude placing the spring under torsional stress.

I have illustrated in Fig. 1 in dotted lines at 32, the position of the end of the piston D at the limit of its return stroke whereas its position, as illustrated in full lines, represents the piston at the end of its pressure stroke. It will be apparent, therefore, that if the carriage G is moved away from the cylinder C against the force of the spring J, an amount equal to the stroke of the piston D, that the effective piston displacement will be zero and at intermediate positions the displacement of the piston in the cylinder C will become a fractional part of its full and normal displacement. Inasmuch as the tension of the spring J may be adjusted at will the operator may determine the pressure developed within the cylinder C at which the piston D will cease its advance into the cylinder C thus causing the motor to move bodily with the cradle G against the spring J. I shall refer to the pressure at which this function first takes place as the "predetermined intermediate pressure." As the motor E and cradle G move away from the cylinder C it is obvious that the effective displacement of the piston D will become less until under increased developed pressure it is moved away from the cylinder C a distance substantially sufficient to equal the normally effective stroke of the piston. The pressure at which this function of the apparatus occurs shall be hereinafter referred to as the "maximum developed pressure" representing the highest pressure of which the pump is capable of producing under the existing adjustment of the spring J.

I have thus provided, in a power driven lubricant pump, a combination and arrangement of parts wherein the motor and the pump piston and the driving means interconnecting the two may move as a unit away from the cylinder upon the development of an intermediate pressure an amount proportional to the increased lubricant pressure until such time as the maximum developed pressure has been attained whereupon, although the motor and pump may remain in operation, the pump will cease to deliver lubricant or to possess a pressure producing function. In the form of the apparatus illustrated in Figs. 1 to 3 during that time which the pump cylinder is subjected to maximum developed pressure the load upon the motor E is represented by the force required to stretch the spring J during the pressure stroke minus that force returned to the motor as the spring J contracts during each return stroke of the piston D. In practice the counter E. M. F. developed in the motor E as it speeds up during the contracting of the spring J at the return stroke of the piston tends to reduce the current consumption of the motor and, under certain conditions, current may be returned to the power line. The mechanical forces involved through the alternate stretching and contraction of the spring J are reduced to a low resultant level because of the momentum or fly wheel effect of the motor armature.

Assuming that the discharge nozzle 8 is connected with a lubricant receiving fitting wherein the resistance to the discharge of lubricant therethrough and into the bearings and parts associated therewith is relatively low, the various elements of the pump would assume the position shown in Fig. 1 and reciprocation of the piston D through the functioning of the motor E and driving connection F will result in the discharge of relatively large quantities of lubricant under pressures below the said predetermined intermediate pressure. If, now, the resistance to the discharge of lubricant is increased substantially requiring lubricant pressure greater than the intermediate developed pressure to force lubricant through the discharge line the entire motor and piston assembly may move away from the cylinder C against the force of the spring J until a balance between the developed pressure and the tension of the spring J has been brought about. Should the resistance to the discharge of lubricant increase a further amount or should the nozzle be shut off by operation of the valve 9 the pressure developed within the cylinder C may increase through operation of the piston D an amount sufficient to move the piston and motor assembly away from the cylinder C a distance in the aggregate equivalent to that of the stroke of the piston D sufficient to preclude the advance of the piston D into the cylinder C beyond the inlet port B.

In Fig. 4 I have illustrated another form of the apparatus which is similar in many respects to that form illustrated in Figs. 1 to 3 and wherein like reference numerals have been employed to designate like parts. The principal difference lies in the addition of dash-pot mechanism for damping the unitary movement of the piston and motor drive assembly. This mechanism comprises a bore 35 formed in the body 3 parallel with the bore of the cylinder C, a double acting piston 36 disposed within the bore 35 and connected to the cradle G by a plunger rod 37 which passes through a packing assembly 38 in the mouth of the bore 35. Air bleed valves 39 and 40 communicate with opposite ends of the bore 35 to provide adjustment for the damping function of the dash-pot. In order to provide the added space required by the clamping mechanism I have employed for the spring J a compression spring instead of a tension spring and placed it between the cradle G and an adjustable stud screw 42 at the adjacent end of the carriage K.

The power driven lubricant pump of Fig. 4 operates precisely the same as that form described in connection with Figs. 1 to 3 inclusive except that the unitary movement of the piston and motor assembly upon the cradle G through reaction of the reciprocatory stroke of the piston D is damped to a degree determinable by adjustment of the bleeder valves 39 and 40, thus greatly reducing the wear upon the driving mechanism and motor when the pump is operating between the predetermined intermediate pressure and its maximum developed pressure.

The apparatus illustrated in Fig. 5 has features in common with both forms of the pump heretofore described and similar reference numerals have been employed to designate similar parts. The distinguishing feature of this form of the apparatus over the apparatus of Figs. 1 and 4 comprises an accumulator in direct communication with the discharge line of the pump as an additional function to that of moving the piston and motor assembly away from the cylinder C against the force of the compression spring J upon increase in pressure within the discharge line above a predetermined intermediate pressure.

The accumulator comprises a bore 51 formed in the body 3 within which a piston 52 is disposed. The piston 52 is secured by threaded engagement to the cradle G as shown at 53. A packing gland assembly 54 functions as a seal for the bore 51 about the piston 52. The bore 51 communicates with the pump cylinder C through an aligned passage 55 and a transverse passage 56 within which a check valve 57, of the spring pressed ball type, is disposed. The discharge port 58 of the pump is located at the remote end of the passage 55 and is provided with internal screw threads for receiving the threaded coupler 7 of the lubricant discharge hose 6.

In operation lubricant, under pressures less than the predetermined intermediate pressure, may pass by way of the passage 56, the valve 57 and the discharge port 58 directly into the discharge line to the nozzle 8. If, however, the pressure in the discharge line, i. e., that portion of the lubricant conducting circuit below the valve 57, is increased the piston 52 of the accumulator will be urged rearwardly against the force of the spring J to decrease the effective piston displacement of the piston D in the cylinder C. Further increase in pressure in the discharge line may cause the piston and motor assembly to move an amount sufficient to reduce the effective piston displacement to zero thus entirely removing the load upon the motor. The motor load may remain thus removed until the pressure in the discharge line is reduced as through the opening of the control valve 9 upon resuming servicing operations subsequent to the closing of the valve. Inasmuch as a considerable quantity of lubricant may be confined in the bore 51 of the accumulator at maximum developed pressure, a substantially uniform flow of lubricant through the discharge port at relatively high pressure is always assured.

While several forms of the invention have been illustrated and described, other forms bearing little structural resemblance thereto may be conceived. Consequently it is not desired that the invention be limited beyond its spirit and the scope of the appended claims.

I claim:

1. A lubricant pump comprising, a stationary cylinder having an inlet, a piston mounted for reciprocation in said cylinder and controlling the inlet to the cylinder, means for reciprocating said piston through a fixed stroke with respect to said reciprocating means, and pressure responsive means for moving said piston with respect to said cylinder to vary the effective displacement thereof.

2. A lubricant pump comprising, a stationary cylinder having a discharge port, a piston having a normally non-variable length of stroke mounted for reciprocation in said cylinder, an accumulator connected to said discharge port, and means responsive to increased pressure in said accumulator for moving said piston away from said cylinder.

3. A power driven lubricant pump comprising, a pump cylinder, a piston mounted for reciprocation in said cylinder, a motor for reciprocating said piston through a normally fixed distance in space, and means responsive to a change in lubricant pressure for moving said motor with said piston toward or away from said cylinder.

4. A power driven lubricant pump comprising, a pump cylinder, a piston mounted for reciprocation in said cylinder, a motor for operating said piston, and means responsive to a change in lubricant pressure for moving said motor toward or away from said cylinder, said means including an accumulator communicating with the discharge port of said pump.

5. A power driven lubricant pump comprising, a substantially stationary cylinder having an inlet port and discharge port, a piston mounted for reciprocation in said cylinder and controlling said inlet port, a motor for driving said piston, and means operable upon increased pressure at said discharge port for moving said motor and said piston away from said cylinder to decrease the effective displacement of said piston in said cylinder.

6. A power driven pump comprising, a substantially stationary pump cylinder, a piston mounted for reciprocation in said cylinder, means for reciprocating said piston through a normally fixed distance with respect to said reciprocating means, a lubricant pressure accumulator connected to the discharge port of said cylinder and means associated with said accumulator for moving said reciprocating means toward or away from said cylinder upon a change in pressure in said accumulator within predetermined limits.

7. A power driven pump comprising, a substantially stationary cylinder having a discharge port, a piston mounted for reciprocation in said cylinder, driving means for said piston movable relative to said cylinder for driving said piston through a normally fixed distance with respect to said driving means, an accumulator connected to said discharge port of said cylinder, a check valve between said discharge port and said accumulator, a lubricant feed conduit connected to said accumulator, and means responsive to a change in lubricant pressure in said accumulator for bodily shifting said driving means with respect to said cylinder.

8. A power driven pump comprising, a substantially stationary cylinder having a discharge port, a piston mounted for reciprocation in said cylinder, driving means for said piston movable relative to said cylinder, a lubricant feed conduit communicating with said discharge port, a check valve between said discharge port and said feed conduit, and means responsive to a change in lubricant pressure in said feed conduit for bodily shifting said driving means together with said piston with respect to said cylinder.

9. A power driven lubricant pump comprising, a pump cylinder, a piston mounted for reciprocation in said cylinder, power driving mechanism for operating said piston, and means responsive to a change in lubricant pressure in the discharge from said pump for moving said power driving mechanism toward or away from said cylinder to vary the effective displacement of said piston in said cylinder.

10. A power driven lubricant pump comprising, a pump cylinder, a piston mounted for reciprocation in said cylinder and for controlling the inlet to the cylinder, power driving mechanism for operating said piston, means for urging said power driving mechanism toward said cylinder in response to a decrease in lubricant pressure in the cylinder to vary the effective displacement of said piston in said cylinder, and means for adjusting said pressure responsive means.

11. A lubricant pump comprising, a stationary cylinder, a piston mounted for reciprocation in said cylinder and controlling the inlet of the cylinder, means for reciprocating said piston through a fixed distance in space, pressure responsive means for moving said piston away from said cylinder to vary the effective displacement thereof, and means for adjusting said pressure responsive means to vary the relationship between pressure and effective piston displacement.

12. A power driven lubricant pump comprising, a relatively stationary support, a pump cylinder mounted on said support, a discharge conduit for said cylinder, a motor mounted on said support and adapted to be moved toward or away from said cylinder, a piston mounted for reciprocation in said cylinder, positive driving means operatively interconnecting said motor and said piston, a preloaded spring for urging said motor toward said cylinder, and means responsive to an increase in developed lubricant pressure for moving said motor away from said cylinder against the action of said spring.

13. A power driven lubricant pump comprising, a relatively stationary support, a pump cylinder mounted on said support, a discharge conduit for said cylinder, a motor mounted on said support and adapted to be moved toward or away from said cylinder, a piston mounted for reciprocation in said cylinder, positive driving means operatively interconnecting said motor and said piston, a spring for urging said motor toward said cylinder, and means responsive to an increase in lubricant pressure in said discharge conduit for moving said motor and said piston therewith away from said cylinder against the force of said spring.

14. A power driven lubricant pump comprising, a pump cylinder, a piston mounted for reciprocation in said cylinder, a motor for operating said piston, said motor with said piston being shiftable with respect to said cylinder in response to a change in lubricant pressure in said cylinder to vary the effective displacement of said piston in said cylinder, and a dash-pot for damping the movement of said piston and driving mechanism relative to said cylinder.

15. A lubricant pump comprising, a pump cylinder, a piston operative in said cylinder, means for driving said piston, a connection between said piston and said driving means, said driving means and said piston being movable as a unit relative to said cylinder, and means tending to maintain movements of said piston between fixed limits with respect to said cylinder.

16. A lubricant pump comprising, a pump cylinder, a piston operative in said cylinder, means for driving said piston, a non-yielding connection between said piston and said driving means, said driving means and said piston being movable as a unit relative to said cylinder, and means tending to maintain movements of said piston between fixed limits with respect to said cylinder.

17. A lubricant pump comprising, a pump cylinder, a piston operative in said cylinder, means for driving said piston, a non-yielding connection between said piston and said driving means, said driving means and said piston being movable relative to said cylinder, and means tending to maintain movements of said piston between fixed limits with respect to said cylinder.

18. A lubricant pump comprising, a support, a stationary pump cylinder mounted on said support, means for supplying lubricant to said cylinder, means for conducting lubricant from said cylinder to a place of use, a piston mounted for reciprocation in said cylinder, a cradle mounted for right line movement on said support in a plane parallel to the axis of said cylinder, a motor fixed to said cradle, driving means between said motor and said piston for driving said piston through a stroke of fixed length, and yieldable means urging said cradle toward said cylinder.

19. A lubricant pump comprising, a support, a stationary pump cylinder mounted on said support, means for supplying lubricant to said cylinder, means for conducting lubricant from said cylinder to a place of use, a piston mounted for reciprocation in said cylinder, a cradle mounted for right line movement on said support in a plane parallel to the axis of said cylinder, a motor fixed to said cradle, driving means between said motor and said piston for driving said piston through a stroke of fixed length, yieldable means urging said cradle toward said cylinder, and dash pot means for damping the movement of said cradle.

20. A lubricant pump comprising, a pump cylinder, a piston mounted for reciprocation in said cylinder, a motor for driving said piston, a non-yielding drive connection between said motor and said piston, and a yielding support for said motor adapted to yield in a direction away from said cylinder when resistance to the movement of said piston in said cylinder is encountered.

JOHN A. WATSON.